United States Patent
Zuo et al.

(10) Patent No.: US 7,583,514 B2
(45) Date of Patent: Sep. 1, 2009

(54) SIM CARD HOLDER

(75) Inventors: Zhou-quan Zuo, Shenzhen (CN); Chia-Hua Chen, Tu-Cheng (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 502 days.

(21) Appl. No.: 11/384,467

(22) Filed: Mar. 20, 2006

(65) Prior Publication Data

US 2006/0270455 A1 Nov. 30, 2006

(30) Foreign Application Priority Data

May 30, 2005 (CN) .................. 2005 1 0034981

(51) Int. Cl.
*H05K 7/14* (2006.01)
*H05K 7/18* (2006.01)

(52) U.S. Cl. ....................... 361/801; 361/756

(58) Field of Classification Search ................ 361/737, 361/727, 801, 802, 756, 741, 686; 439/737, 439/747, 629, 296, 325, 326, 152–155, 327
See application file for complete search history.

(56) References Cited

U.S. PATENT DOCUMENTS

| | | | |
|---|---|---|---|
| 5,816,838 A * | 10/1998 | Del Prete et al. ............ 439/326 |
| 6,343,018 B1 * | 1/2002 | Takeyama et al. ........... 361/737 |
| 6,398,572 B1 * | 6/2002 | Larsson ...................... 439/327 |
| 6,831,977 B2 * | 12/2004 | Kiernan et al. ......... 379/433.09 |
| 6,839,239 B1 * | 1/2005 | Lee ............................. 361/752 |
| 7,097,511 B1 * | 8/2006 | Chen et al. .................. 439/630 |
| 7,238,038 B2 * | 7/2007 | Kumagai .................... 439/326 |
| 2003/0134602 A1 * | 7/2003 | Haga et al. .................... 455/90 |

* cited by examiner

*Primary Examiner*—Hung S Bui
(74) *Attorney, Agent, or Firm*—Steven M. Reiss

(57) ABSTRACT

A SIM card holder (200) includes a receiving groove (11) defined in a body (10) and a latch module (12). The body defines a receiving groove configured for receiving a SIM card (20) therein and has a bottom surface at the receiving groove. The latch module includes a holding piece (101) extending from the body and located above the receiving groove, and an elastic element is located adjacent to one end of the receiving groove. The holding piece is separated from the bottom surface along a first axis perpendicular to the bottom surface at a distance essentially equal to a thickness of the SIM card, the elastic element is configured for latching the SIM card in the receiving groove along a second axis parallel to the bottom surface and is configured for being downwardly deformable to release the SIM card.

12 Claims, 6 Drawing Sheets

SIM CARD HOLDER

BACKGROUND OF THE INVENTION

1. Field of the Invention

The present invention generally relates to mechanisms for holding surface contact cards of portable electronic devices and, particularly, to a subscriber identity module (SIM) card holder for holding a SIM card in a portable electronic device.

2. Discussion of the Related Art

With the development of wireless communication and information processing technologies, portable electronic devices such as mobile phones are now in widespread use. These electronic devices enable consumers to enjoy the convenience of high-tech services anytime and anywhere. Surface contact cards having special circuits are widely used in portable electronic devices to enhance or specialize the functions of the portable electronic devices. For example, a SIM card is placed in a mobile phone to dedicate the mobile phone functions to the SIM card owner. By changing SIM cards, a single mobile phone can be used by many different SIM card owners as a personal phone.

Referring now to FIG. 1, a conventional mechanism for holding a SIM card includes a base 32 made of insulating material and a holding structure 34. The base 32 defines a receiving groove 321 and a SIM connector 30 comprising a plurality of contacts is set in the middle of the receiving groove 321. The size of the receiving groove 321 is the same as that of a SIM card. The holding structure 34 is located adjacent to one end of the receiving groove 321 and can be moved back and forth along the direction as indicated by the arrow shown in FIG. 1.

In use, firstly, the holding structure 34 is moved away from the receiving groove 321 and a SIM card is received in the receiving groove 321. Then, the holding structure 34 is moved adjacent to the receiving groove 321 for latching the SIM card in the receiving groove 321. In the same way, the SIM card can be released by moving the holding structure 34 away from the receiving groove 321.

In the above conventional mechanism for holding a SIM card, the holding structure 34 can be easily moved, if a mobile phone employing such a mechanism for holding a SIM card drops to ground, a shock will easily force the holding structure 34 to move off the receiving groove 321. As a result, the SIM card will not connect well with the SIM contactor 30 or even be released from the receiving groove 321. Obviously, such a conventional mechanism can not hold the SIM card steadily in the receiving groove 321.

Therefore, there is a need for a new SIM card holder, which can hold a SIM card steadily in a portable electronic device.

SUMMARY OF THE INVENTION

The present SIM card holder includes a receiving groove defined in a body and a latch module. The body defines a receiving groove configured for receiving a SIM card therein and has a bottom surface at the receiving groove. The latch module includes a holding piece extending from the body and located above the receiving groove, and an elastic element is located adjacent to one end of the receiving groove. The holding piece is separated from the bottom surface along a first axis perpendicular to the bottom surface by a distance essentially equal to a thickness of the SIM card, the elastic element is configured for latching the SIM card in the receiving groove along a second axis parallel to the bottom surface and is configured so as to be downwardly deformable for releasing the SIM card.

Other advantages and novel features of the present stylus removal mechanism will become more apparent from the following detailed description when taken in conjunction with the accompanying drawings.

BRIEF DESCRIPTION OF THE DRAWINGS

Many aspects of the SIM card holder can be better understood with reference to the following drawings. The components in the drawings are not necessarily to scale, the emphasis instead being placed upon clearly illustrating the principles of the present SIM card holder. Moreover, in the drawings, like reference numerals designate corresponding parts throughout the several views.

DETAILED DESCRIPTION OF THE EMBODIMENTS

Figure 1:
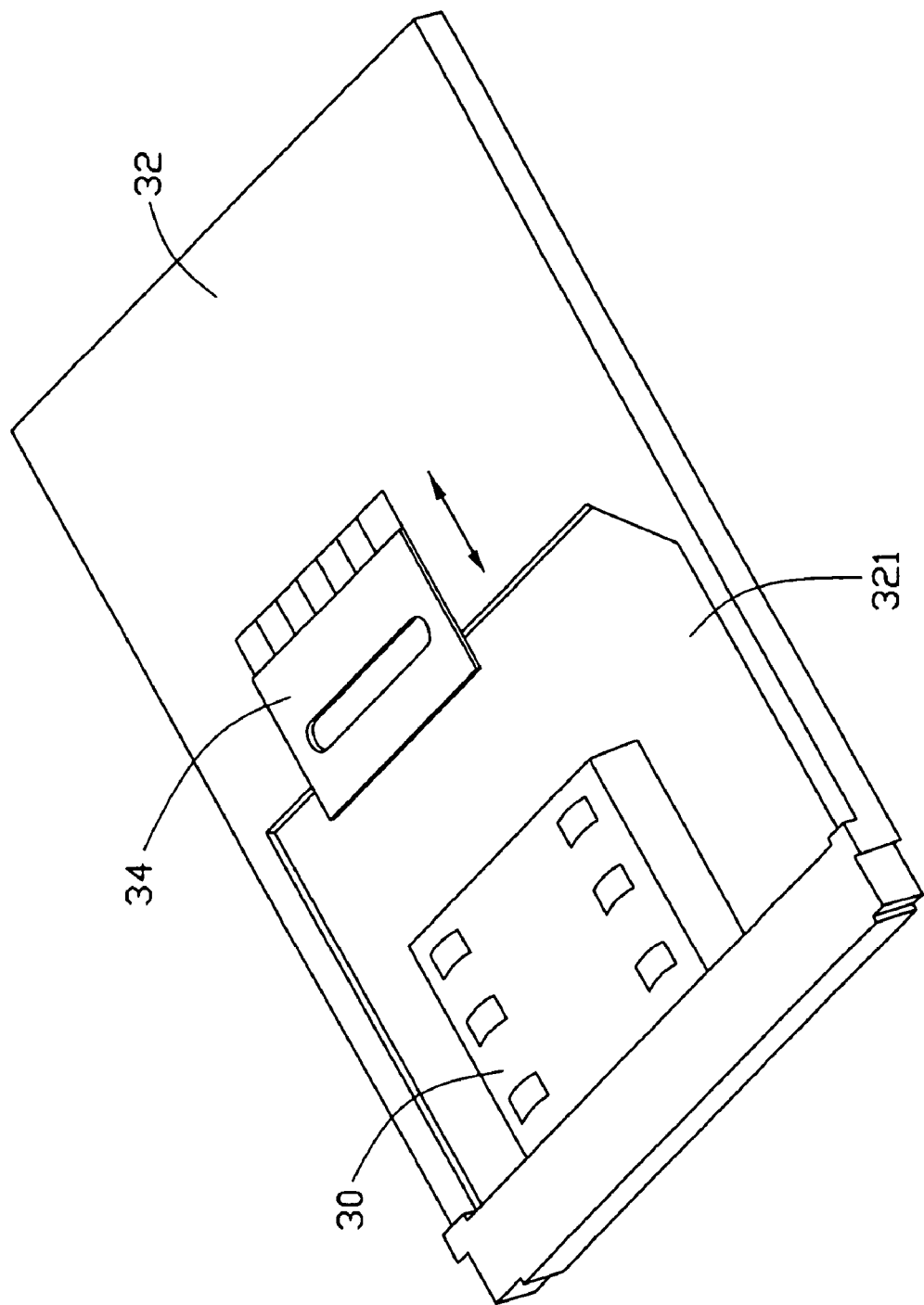
FIG. 1 is an exploded, isometric view of a conventional SIM card holder.
Figure 2:
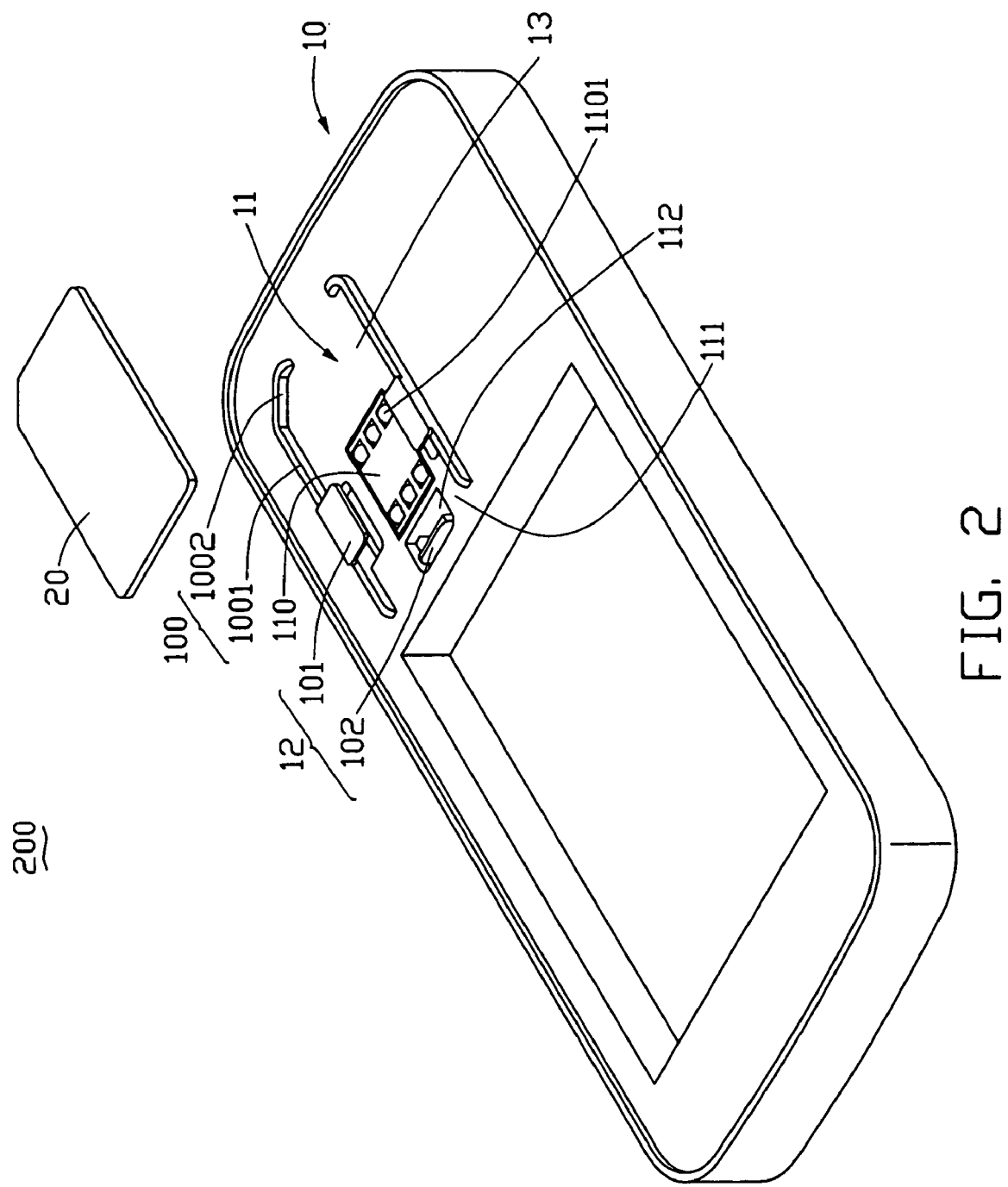
FIG. 2 is an exploded, isometric view of SIM card holder, in accordance with a preferred embodiment of the present SIM card holder.
Figure 3:
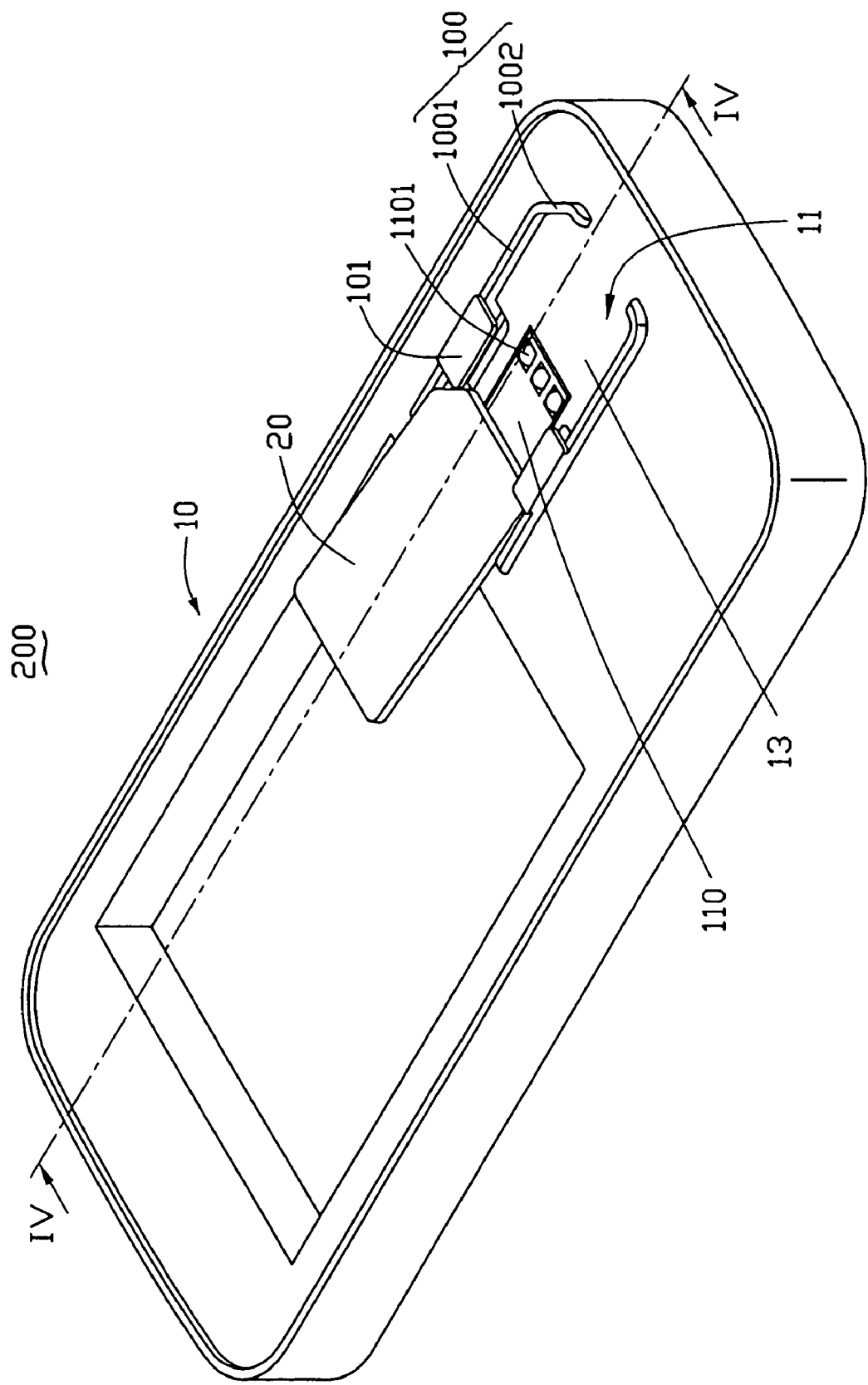
FIG. 3 is similar to FIG. 2, but showing a SIM card being assembled to the SIM card holder.
Figure 4:
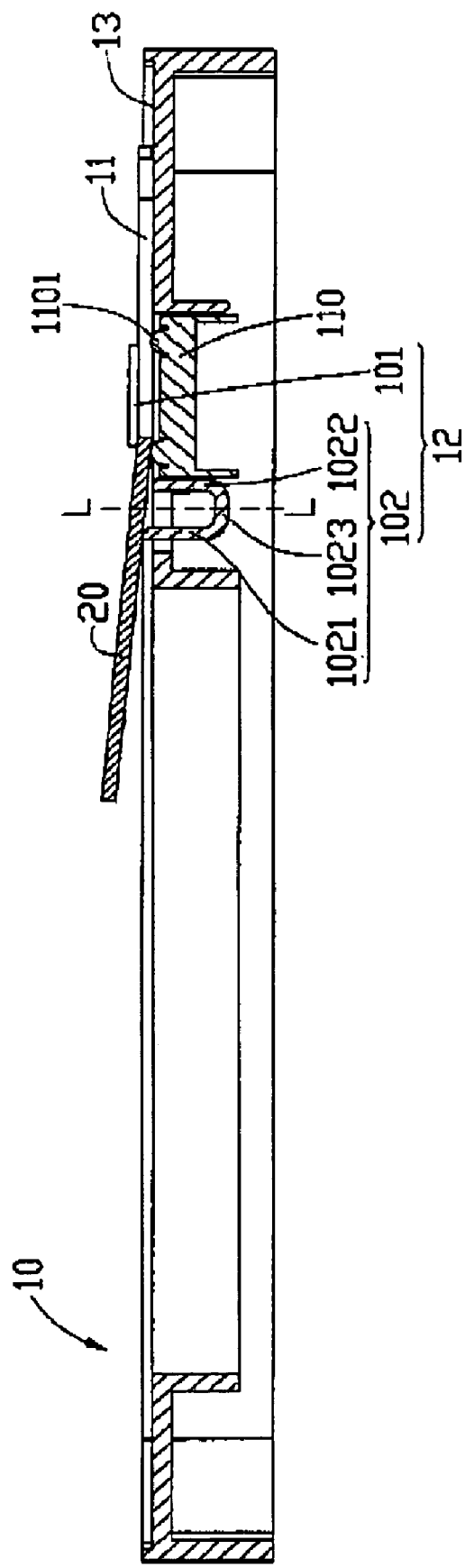
FIG. 4 is cross-sectional view of the SIM card holder taken along IV-IV line of FIG. 3.
Figure 5:
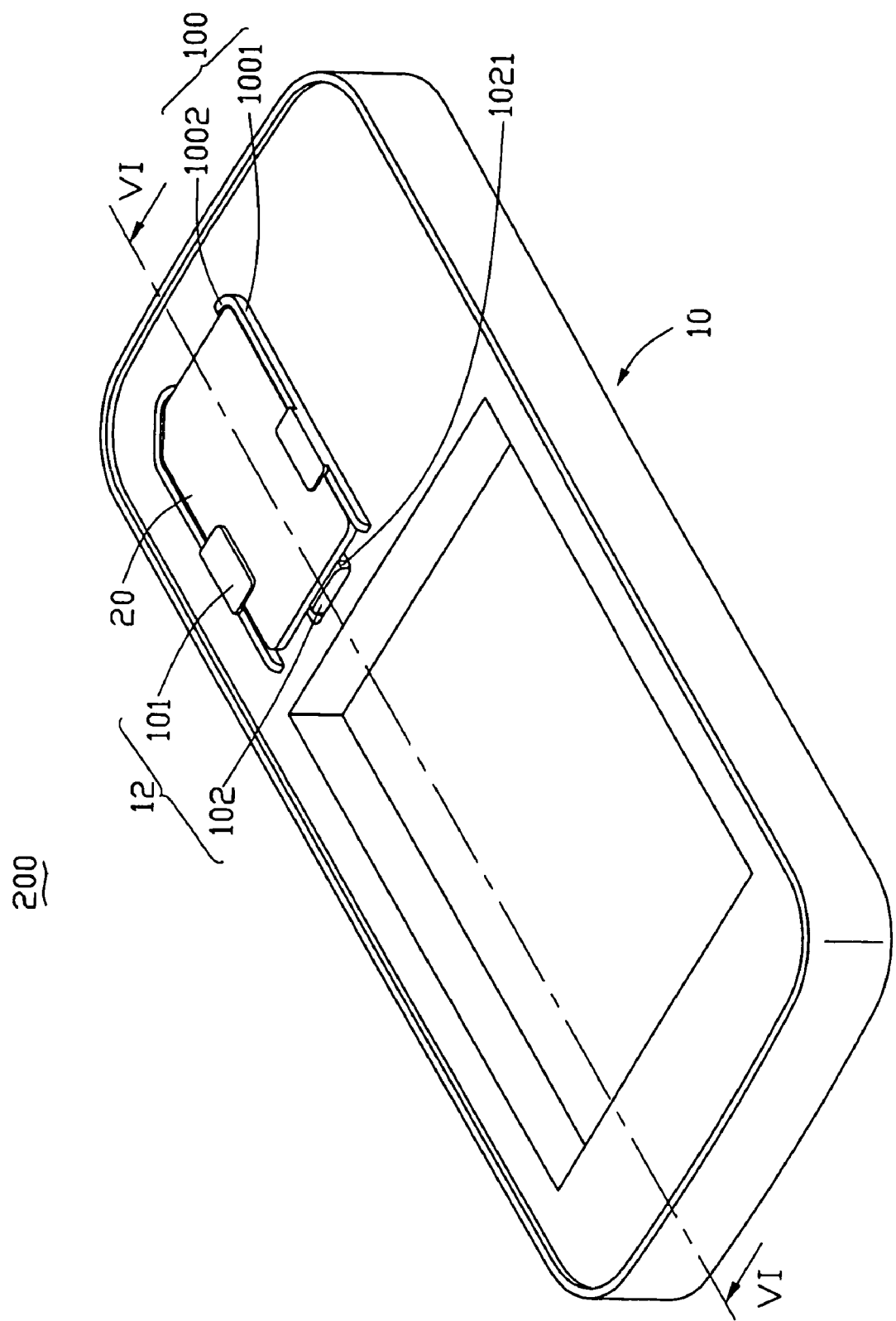
FIG. 5 is an assembled view of the SIM card holder.
Figure 6:
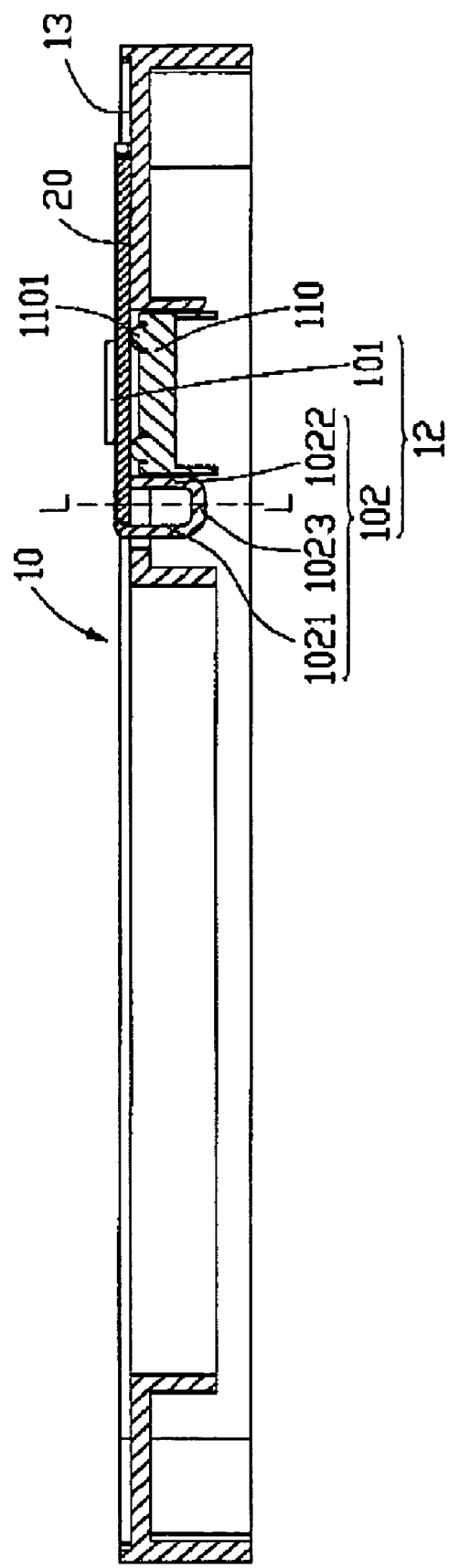
FIG. 6 is a cross-sectional view taken along VI-VI line of FIG. 5.

Referring now to FIG. 2 and FIG. 4, in a preferred embodiment, a SIM card holder 200 includes a body 10 defining a receiving groove 11, and a latch module 12. The body 10 has a bottom surface 13 in the receiving groove 11.

The receiving groove 11 is a receiving space configured for receiving a SIM card 20 therein, and a size of the receiving groove 11 is the same as that of the SIM card 20. The receiving groove 11 has a card entrance 111. The body 10 defines a cavity 112 at the entrance 111. Two protruding bars 100 protrude from the bottom surface 13. The protruding bars 100 and part of the bottom surface 13 cooperatively define the receiving groove 11 therebetween. Each protruding bar 100 includes a straight portion 1001 and a bend portion 1002 connected to one end of the straight portion 1001. The straight portions 1001 of the protruding bars 100 are parallel to each other and a width between the straight portions is the same as that of the SIM card 20. A SIM card connector 110 is set in the middle of receiving groove 11 and the SIM card connector 110 includes a plurality of contactors 1101 extending out of the bottom surface 13.

The latch module 12 includes two holding pieces 101 and an elastic element 102. The holding piece 101 extends from the protruding bar 100 of the body 10 and is located above the receiving groove 11, parallel to the bottom surface 13. The holding piece 101 is substantially rectangular in shape. Along a first axis perpendicular to the bottom surface 13, the holding piece 101 is separated from the bottom surface 13 by a distance essentially equal to a thickness of the SIM card 20. Therefore, the holding piece can hold the SIM card 20 in the receiving groove along the first axis. The elastic element 102 is U-shaped, having a longitudinal axis L-L that is also perpendicular to the bottom surface 13, and including an elastic pressing portion 1021 and a connecting portion 1022 joined together by a curved portion 1023. The elastic pressing portion 1021 is parallel to the connecting portion 1022 and both are parallel to longitudinal axis L-L. The connecting portion 1022 extends from the bottom surface 13 of the receiving groove 11. The elastic element 102 is received in the cavity 112 with the connecting portion 1022 being connected with body 10, but not extending higher than the bottom surface 13 of the receiving groove 11. On the other hand, the top of the pressing portion 1021 extends higher than the bottom surface 13 of the receiving groove 11. The pressing portion 1021 forms a wedge surface at a top end thereof.

Referring to FIGS. 3-6, in use, to mount the SIM card 20 in the receiving groove 11, firstly, the SIM card 20 is disposed at a slant and adjacent to the elastic element 102 at one end of the receiving groove 11, then the SIM card 20 is pushed into the receiving groove 11. In that process the SIM card 20 will press the pressing portion 1021 to move downwards. When the SIM card 20 is completely received in the receiving groove 11, the pressing portion 1021 returns to its original position. The pressing portion 1021 is higher than the bottom surface of the receiving groove 11, so that the pressing portion 1021 can stop the SIM card 20 from moving out of the receiving groove 11 along an axis parallel to the bottom surface 13, by abutting against one end of the SIM card 20. In addition, the holding pieces 101 stops the SIM card from moving along an axis perpendicular to the bottom surface 13 of the receiving groove 11. Therefore, the SIM card holder holds the SIM card 20 steadily by the holding pieces 101 and the elastic element 102.

To remove the SIM card 20, the pressing portion 1021 is manually pressed to deform downward until the top of the pressing portion 1021 disengages from the SIM card 20. The SIM card 20 is then ready to be taken out. The wedge surface on the top of the pressing portion 1021 can function as a guide surface along which the SIM card 20 can slide out.

In an alternate embodiment, the number of the holding pieces 101 can be one or more than two. The shape of holding piece 101 is not limit to a substantially rectangular in shape. The elastic element 102 can also be of another shape. The SIM card holder 200 can be used for other surface contact cards such as compact flash cards (CF) and multimedia cards (MMC).

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A SIM card holder comprising:
    a body defining a receiving groove configured for receiving a SIM card therein, the body having a bottom surface in the receiving groove; and
    a latch module comprising a holding piece extending from the body and located above the receiving groove, end an elastic element located adjacent to one end of the receiving groove, the holding piece being separated from the bottom surface along a first axis perpendicular to the bottom surface at a distance substantially equal to a thickness of the SIM card, the elastic element being U-shaped and having a longitudinal axis perpendicular to the bottom surface, the elastic element being configured for latching the SIM card in the receiving groove along a second axis parallel to the bottom surface by a portion of the elastic element abutting against the SIM card and being configured so as to be downwardly deformable for releasing the SIM card.

2. The SIM card holder as claimed in claim 1, the elastic element comprising an elastic pressing portion end a connecting portion joined together by a curved portion and parallel to the longitudinal axis of the elastic element, the connecting portion connecting to the body.

3. The SIM card holder as claimed in claim 2, wherein a top of the pressing portion is higher than the bottom surface, and the pressing portion is configured for abutting against the SIM card to latch the SIM card in the receiving groove.

4. The SIM card holder as claimed in claim 1, wherein the body comprises a protruding bar protruding from the bottom surface, and the protruding bar and the bottom surface cooperatively define the receiving groove therebetween.

5. The SIM card holder as claimed in claim 4, wherein the protruding bar comprises two straight portions that are parallel to each other, and a width between the straight portions is substantially the same as that of the SIM card.

6. The SIM card holder as claimed in claim 4, wherein the holding piece extends from the protruding bar, parallel to the bottom surface.

7. The SIM card holder as claimed in claim 1, wherein a SIM card connector is formed in the body and extends out of the bottom surface.

8. A holder for holding a surface contact card in a portable electronic device, the holder comprising:
    a device body defining a receiving groove configured for receiving the surface contact card therein, the receiving groove having a card entrance, the device body having a bottom surface at the receiving groove;
    an elastic element located at the entrance, the elastic element being U-shaped and having a longitudinal axis perpendicular to the receiving groove and comprising an elastic pressing portion and extending out of the bottom surface for abutting against the surface contact card, the elastic pressing portion being operable to deform downward toward the device body for disengaging from the surface contact card.

9. The holder of claim 8, wherein the device body defines a cavity at the entrance, the elastic element is received in the cavity.

10. The holder of claim 8, wherein the pressing portion firms a wedge surface at a top end thereof.

11. The holder of claim 8, wherein the elastic element comprises a connecting portion connecting connects the body with the pressing portion.

12. The holder as claimed in claim 11, wherein a top of the pressing portion is higher than the bottom surface, and the pressing portion is configured for abutting against the SIM card to latch the SIM card in the receiving groove.

* * * * *